(12) United States Patent
Yang et al.

(10) Patent No.: US 9,227,595 B2
(45) Date of Patent: Jan. 5, 2016

(54) METHODS, SYSTEMS AND APPARATUS FOR PROVIDING NOTIFICATION THAT A VEHICLE HAS BEEN ACCESSED

(71) Applicant: GM GLOBAL TECHNOLOGY OPERATIONS LLC, Detroit, MI (US)

(72) Inventors: Linxuan Yang, Oshawa (CA); Jarvis Chau, Markham (CA); Neeraj R. Gautama, Whitby (CA); Mark A. Manickaraj, Ajax (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 99 days.

(21) Appl. No.: 14/069,185

(22) Filed: Oct. 31, 2013

(65) Prior Publication Data

US 2015/0116100 A1 Apr. 30, 2015

(51) Int. Cl.
*B60R 25/10* (2013.01)
*B60R 25/102* (2013.01)
*G07C 9/00* (2006.01)

(52) U.S. Cl.
CPC .......... *B60R 25/102* (2013.01); *G07C 9/00119* (2013.01)

(58) Field of Classification Search
CPC .............................. B60R 25/102; H04W 4/046
USPC ............ 340/426.19, 426.13, 5.21, 5.61, 10.4; 455/456.1, 456.2
See application file for complete search history.

(56) References Cited

U.S. PATENT DOCUMENTS

| | | | |
|---|---|---|---|
| 2002/0163419 A1* | 11/2002 | Ott | 340/5.61 |
| 2005/0237166 A1* | 10/2005 | Chen | 340/426.13 |
| 2006/0044108 A1* | 3/2006 | Nowottnick | 340/5.61 |
| 2006/0077042 A1* | 4/2006 | Hock | 340/10.4 |
| 2011/0210830 A1* | 9/2011 | Talty et al. | 340/10.51 |

* cited by examiner

*Primary Examiner* — Tai T Nguyen
(74) *Attorney, Agent, or Firm* — Ingrassia Fisher & Lorenz, P.C.

(57) ABSTRACT

Computer-implemented methods, systems and apparatus are disclosed for providing a notification when a vehicle has been accessed by an unauthorized person. An onboard computer system of a vehicle is activated in response to a trigger event indicating that the vehicle has been accessed. It is determined whether an authorized consumer electronics device (CED), that is associated with an authorized person, is connected to a wireless communication interface of an onboard computer system. When an authorized CED has not connected to the wireless communication interface, a notification message is communicated that indicates that the vehicle has been accessed and that an authorized CED has not connected to the wireless communication interface.

22 Claims, 6 Drawing Sheets

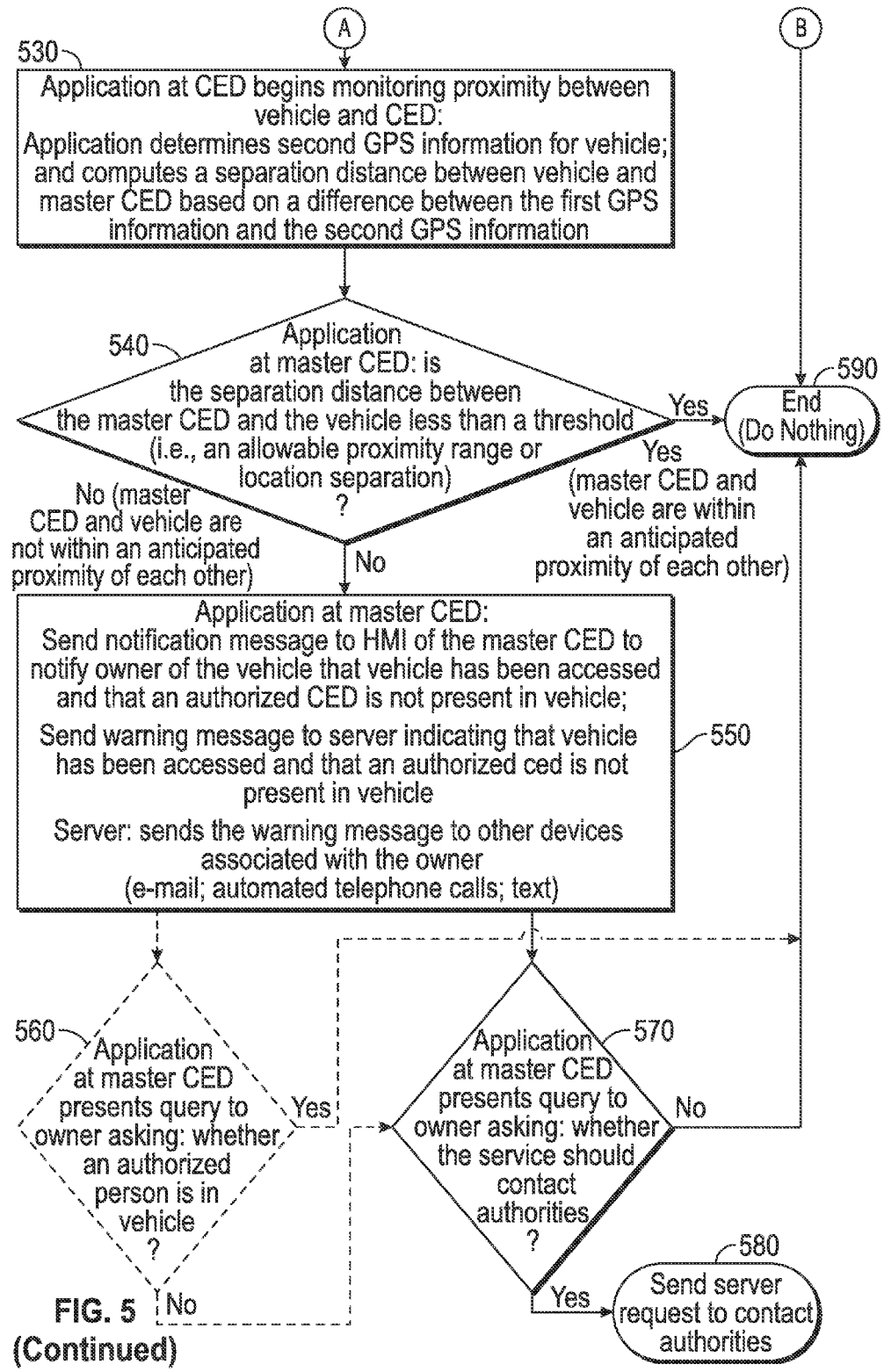

METHODS, SYSTEMS AND APPARATUS FOR PROVIDING NOTIFICATION THAT A VEHICLE HAS BEEN ACCESSED

TECHNICAL FIELD

The technical field generally relates to vehicles, and more particularly relates to methods, systems and apparatus for providing notification that a vehicle has been accessed.

BACKGROUND

Many vehicles today include on-board computers that perform a variety of functions. For example, on-board computers control operation of the engine, control systems within the vehicle, provide security functions, perform navigation tasks, and facilitate communications with remote driver-assistance centers that can provide services including in-vehicle safety and security, navigation, and remote-diagnostics.

In some cases, a vehicle can be accessed without the owner's authorization. For instance, someone could enter or drive the vehicle without the owner's permission.

It would be desirable to provide methods, systems and apparatus for providing notification that a vehicle has been accessed without the owner's authorization (e.g., stolen). It would also be desirable if such methods, systems and apparatus can alert a vehicle owner when their vehicle is accessed, moved and/or driven without their permission or knowledge thereof. Other desirable features and characteristics of the disclosed embodiments will become apparent from the subsequent detailed description and the appended claims, taken in conjunction with the accompanying drawings and the foregoing technical field and background.

SUMMARY

The disclosed embodiments relate to providing a notification to an owner of a vehicle when their vehicle has been accessed and/or moves without the owner's permission. In one implementation, the disclosed embodiments can provide a notification to an owner of a vehicle when their vehicle is accessed or used without their authorization (e.g., entered without the owner's permission and/or stolen).

In accordance with an embodiment a method is provided. When an onboard computer system of a vehicle is activated in response to a trigger event, the AHU can determine whether an authorized consumer electronics device (CED) has connected to a wireless communication interface of the onboard computer system. When it is determined that an authorized CED has not connected to the wireless communication interface, the onboard computer system can communicate a notification message, intended for the owner of the vehicle, that indicates that the vehicle has been accessed by an unauthorized person and that an authorized CED has not connected to the wireless communication interface of the onboard computer system. In addition, the onboard computer system can also communicate a warning message to a server. This warning message can also indicate that the vehicle has been accessed and that an authorized CED has not connected to the wireless communication interface of the onboard computer system.

In another embodiment, a system is provided for notifying an owner of a vehicle that the vehicle has been accessed by an unauthorized person is provided. The system includes the vehicle, a master CED associated with the owner of the vehicle, and a server. The vehicle includes an onboard computer system, and the master CED includes a processor that executes an application. In response to a trigger event, the onboard computer system is configured to determine whether an authorized CED that is associated with an authorized person has connected to a wireless communication interface of the onboard computer system. When the onboard computer system determines that an authorized CED has not connected to the wireless communication interface of the onboard computer system, the onboard computer system can communicate a notification message (intended for the owner of the vehicle) that indicates that the vehicle has been accessed and that an authorized CED has not connected to the wireless communication interface of the onboard computer system. In some implementations, the onboard computer system can also communicate a warning message to the server when the onboard computer system determines that an authorized CED (associated with an authorized person) has not connected to the wireless communication interface of the onboard computer system. The warning message to the server indicates that the vehicle has been accessed and that an authorized CED has not connected to the wireless communication interface of the onboard computer system.

In another embodiment, a vehicle is provided having an onboard computer system that includes a processor. In response to a trigger event indicating that the vehicle has been accessed, the processor can determine whether an authorized CED, that is associated with an authorized person, has connected to a wireless communication interface of the onboard computer system. When the processor of the onboard computer system determines that an authorized CED has/is not connected to the wireless communication interface, the processor can generate and communicate a notification message, intended for an owner of the vehicle, that indicates that the vehicle has been accessed and that an authorized CED has not connected to the wireless communication interface to notify the owner that the vehicle has been accessed by an unauthorized person. The notification message can be sent to a master CED and presented at a human machine interface of the master CED. In addition, in some implementations, the processor can also communicate a warning message to a server that indicates that the vehicle has been accessed and that an authorized CED has not connected to the wireless communication interface.

In another embodiment, a CED associated with an owner of a vehicle (also referred to herein as a "master" CED) is provided that includes a memory and a processor. The memory stores an application that can be executed by the processor in response to receiving an indication that the vehicle has been accessed and that an authorized CED has not connected to a wireless communication interface of the vehicle. The application includes a first module of processor executable instructions. The first module is executed by the processor to compute a separation distance between vehicle and the CED based on a difference between first GPS coordinates of the vehicle and second GPS coordinates of the CED. The first module can then determine whether the separation distance is less than a threshold, and if not, then the first module can send a notification message to a human machine interface of the CED to notify owner of the vehicle that vehicle has been accessed and that an authorized CED has not connected to vehicle. In some implementations, the first module can also send a warning message to a remote server indicating that the vehicle has been accessed and that an authorized CED has not connected to vehicle.

DESCRIPTION OF THE DRAWINGS

The exemplary embodiments will hereinafter be described in conjunction with the following drawing figures, wherein like numerals denote like elements, and wherein.

DETAILED DESCRIPTION

Various embodiments of the present disclosure are disclosed herein. The disclosed embodiments are merely examples that may be embodied in various and alternative forms, and combinations thereof. The following detailed description is merely exemplary in nature and is not intended to limit the application and uses. The word "exemplary" is used exclusively herein to mean "serving as an example, instance, or illustration." Any embodiment described herein as "exemplary" is not necessarily to be construed as preferred or advantageous over other embodiments. As used herein, for example, "exemplary" and similar terms, refer expansively to embodiments that serve as an illustration, specimen, model or pattern. Furthermore, there is no intention to be bound by any expressed or implied theory presented in the preceding technical field, background, brief summary or the following detailed description.

Overview

Before describing some of the disclosed embodiments, it should be observed that the disclosed embodiments generally relate to methods, systems and apparatus for providing notification that a vehicle has been accessed without the owner's authorization (e.g., accessed without permission, stolen, moved, etc.) Notably, the disclosed embodiments can be implemented using existing hardware with some additional software applications being added at the master CED, onboard computer system and the server.

Figure 1:
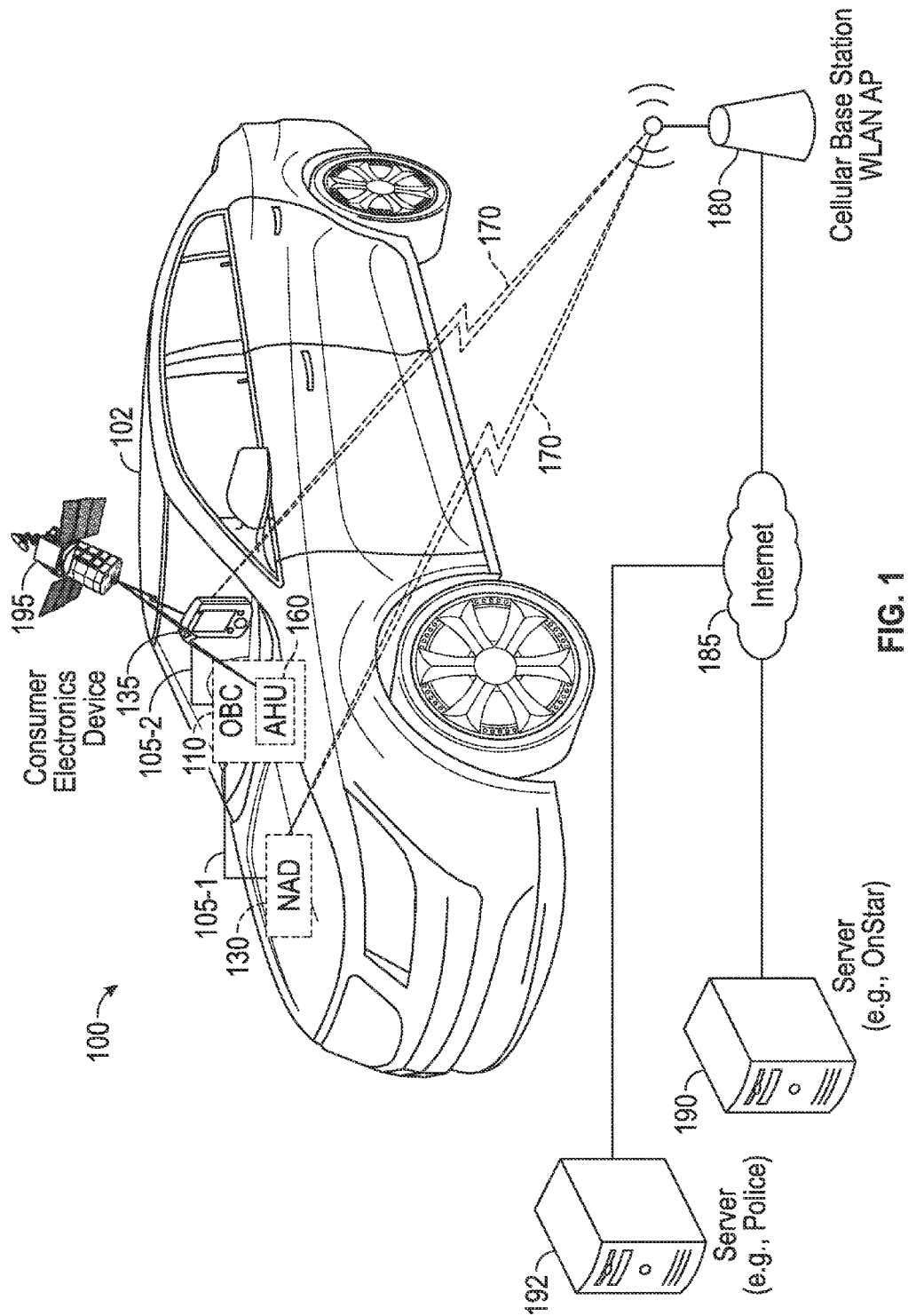
FIG. 1 is a communication system in accordance with some of the disclosed embodiments.

FIG. 1 is a communication system 100 in accordance with some of the disclosed embodiments. The communication system 100 includes a vehicle 102, a consumer electronics device (CED) 135, communication infrastructure 180, a network 185 such as the Internet, a server 190 (e.g., a telematics server), a voice server 192 (e.g., that is associated with a vehicle recovery agency such as a police department), and a Global Positioning System (GPS) satellite 195.

The vehicle 102 includes an embedded network access device (NAD) 130 that is communicatively coupled to an onboard computer system 110 of the vehicle 102. As will be described below, the onboard computer 110, a master CED associated with the owner of the vehicle 102 (not illustrated in FIG. 1), and the server 190 can be used to provide a system for notifying an owner of a vehicle 102 that the vehicle 102 has been accessed by an unauthorized person.

The onboard computer system 110 includes an automotive head unit (AHU) 160. The embedded NAD 130 and the AHU 160 can be communicatively coupled over any type of communication link including, but not limited to a wired communication link such as a bus 105-1 or USB connection, or a wireless communication link such as a Bluetooth communication link or WLAN communication link, etc. An example implementation of the onboard computer system 110 will be described below with reference to FIG. 2. Further, it is noted that although the embedded NAD 130 and AHU 160 are illustrated as separate blocks that are coupled via the bus 105-1, in other embodiments, the NAD 130 can be part of the AHU 160.

The NAD 130 is a communication device that is physically and mechanically integrated/embedded within the vehicle 102. The embedded NAD 130 allows the vehicle 102 to communicate information over-the-air using one or more wireless communication links 170. The embedded NAD 130 allows the onboard computer system 110 including the AHU 160 of the vehicle 102 to exchange information over wide area networks 185, such as the Internet, and to communicate with external networks and infrastructure such as the server 190 so that they can communicate and share information with each other. This information can be in the form of packetized data that can include data, control information, audio information, video information, textual information, etc.

The CED 135 (also referred to below simply as a device 135) can be any type of electronics device that is capable of wireless communication with a network. As will be described below with reference to FIG. 2, the CED 135 includes elements such as a transceiver, computer readable medium, processor, and a display. The CED 135 can be, for example, any number of different portable wireless communications devices, such as personal or tablet computers, cellular telephones, smartphones, etc.

In the embodiment of FIG. 1, the CED 135 is a smartphone. In this regard, it is noted that as used herein, a smartphone refers to a mobile telephone built on a mobile operating system with more advanced computing capability and connectivity than a feature phone. In addition to digital voice service, a modern smartphone has the capability of running applications and connecting to the Internet, and can provide a user with access to a variety of additional applications and services such as text messaging, e-mail, Web browsing, still and video cameras, MP3 player and video playback, etc. Many smartphones can typically include built in applications that can provide web browser functionality that can be used display standard web pages as well as mobile-optimized sites, e-mail functionality, voice recognition, clocks/watches/timers, calculator functionality, personal digital assistant (PDA) functionality including calendar functionality and a contact database, portable media player functionality, low-end compact digital camera functionality, pocket video camera functionality, navigation functionality (cellular or GPS), etc. In addition to their built-in functions, smartphones are capable of running an ever growing list of free and paid applications that are too extensive to list comprehensively.

The CED 135 is Bluetooth-enabled meaning that it includes a Bluetooth-compliant communication interface including a Bluetooth antenna and a Bluetooth chipset having a Bluetooth controller and a host (not illustrated in FIG. 1) as defined in the any of the Bluetooth communication standards that are incorporated by reference herein. The Bluetooth chipset generates signals to be transmitted via the Bluetooth antenna, and also receives signals transmitted from other Bluetooth-enabled interfaces via their Bluetooth antennas. In this regard, it is noted that the CED 135 and a Bluetooth interface (not illustrated) of the vehicle 102 both include a Bluetooth antenna (not illustrated) and one or more Bluetooth chipset(s) (not illustrated) so that they are capable of implementing all known Bluetooth standards and protocols including a Bluetooth Low Energy (BLE) protocol. Bluetooth technical specifications are developed and published by the Bluetooth Special Interest Group (SIG). Bluetooth Core Specification Version 4.0, adopted Jun. 30, 2010, Core Specification Supplement (CSS) v1 adopted Dec. 27, 2011, Core Specification Addendum (CSA) 2 adopted Dec. 27, 2011, Core Specification Supplement (CSS) v2 adopted Jul. 24, 2012, and Core Specification Addendum (CSA) 3 adopted Jul. 24, 2012, describe various features of the BLE standards, and are incorporated by reference herein in their entirety. Copies of any of the incorporated Core Specifications, including the Bluetooth Specification Version 4.0, can be obtained from the Bluetooth Special Interest Group (SIG) by contacting them in writing at Bluetooth Special Interest Group, 5209 Lake Washington Blvd NE, Suite 350, Kirkland, Wash. 98033, USA, or by visiting their website and downloading a copy. Bluetooth Core Specification Version 4.0 includes Classic Bluetooth, Bluetooth High Speed (HS) protocols and Bluetooth Low Energy (BLE).

Because the CED 135 is portable it can be present inside the vehicle 102 (e.g., when carried into the vehicle 102 by a person such as the driver, a passenger, or occupant), or can be located outside the vehicle 102. For instance, the CED 135 can be carried close to or inside the vehicle 102 or can be carried relatively far away from the vehicle 102. When the CED 135 is located in communication range of a wireless communication interface of the AHU 160, the CED 135 can establish a wireless connection with the wireless interface of the AHU 160 over a short-range wireless communication link. The CED 135 can also be carried into the vehicle 102 by an occupant and can then be communicatively coupled to the USB ports via wired connection. When the CED 135 is coupled to the AHU 160, it can transmit information to the AHU 160 or receive information from the AHU 160 as data packets (e.g., as IP packets) via a USB connection to ports or via a Bluetooth or WLAN link to corresponding interfaces. When the CED 135 is located outside the vehicle 102 (e.g., when removed from the vehicle 102), and it moves outside communication range of the wireless interface of the AHU 160 its communication link and connection with the wireless interface of the AHU 160 can be disrupted (e.g., terminated).

In this context, the term "connected" means that the CED 135 and at least one wireless communication interface of the onboard computer system 110 (e.g., WLAN interface 266 or Bluetooth interface 266 or a wireless interface implemented at the embedded NAD 130) have established a connection and are presently in a connected state that allows them to communicate with one another. The "connection" between the CED 135 and the onboard computer system 110 can be a wireless point-to-point connection over a short range wireless communication link. For example, both the CED 135 and the AHU 160 can include a Bluetooth interface. Each Bluetooth interface can include a Bluetooth antenna and Bluetooth chipset(s) and are capable of implementing all known Bluetooth standards and protocols including a Bluetooth Low Energy (BLE) protocol, and therefore, in one embodiment, the wireless connection can be a Bluetooth or BLE connection over a Bluetooth or BLE communication link. In addition, in some implementations the CED 135 is configured to establish radio communication with the onboard computer system 110 using near field communication (NFC), where the "connection" between the CED 135 and the onboard computer system 110 can be detected based on near field communications between the CED 135 and the onboard computer system 110. As is known in the art, NFC standards cover communications protocols and data exchange formats that are based on existing radio-frequency identification (RFID) standards including, for example, ISO/IEC 14443 and ISO/IEC 18092 and those defined by the NFC Forum.

As will be described in greater detail below, the status of the CED 135 with respect to the vehicle 102 can vary depending on who the CED 135 belongs to and how the owner designates a particular CED. The CED 135 can thus be referred to as: a master CED when it is associated with an owner of the vehicle, as an authorized CED when it has been designated by the owner as being associated with an individual who has permission to access, use and/or operate the vehicle 102, or as an unauthorized CED when it is a CED that is not a master CED or authorized CED. As will also be described in greater detail below, the disclosed embodiments allow persons who possess either the master CED or any other authorized CED to access, use and/or operate the vehicle 102. By contrast, when someone who does not possess either the master CED or any other authorized CED attempts to access, use and/or operate the vehicle 102, notification and warning messages will be generated and communicated to the owner and the server 190. Further, it is noted that in order for the disclosed embodiments to be implemented there is no requirement that any CED be present within the vehicle 102, in close proximity to the vehicle 102, or connected to a wireless communication interface of the onboard computer system 110 of the vehicle 102. It is also noted that, when the disclosed embodiments are implemented, the master CED can be located anywhere with respect to the vehicle 102 (including far away such that a wireless connection cannot be established with the wireless communication interface of the onboard computer system 110 of the vehicle 102).

The communication infrastructure 180 is communicatively coupled to the server 190 through a network 185, such as, the Internet. The communication infrastructure 180 allows the NAD 130 to communicate with the external networks and the remotely located server 190 over wireless communication link(s) 170. Communication infrastructure 180 can generally be any public or private access point that provides an entry/exit point for the NAD 130 to communicate with an external communication network 185 over wireless communication link(s) 170. Communications that utilize communication infrastructure 180 are sometimes referred to colloquially as vehicle-to-infrastructure, or V2I, communications. Depending on the implementation, the communication infrastructure 180 can be a cellular base station, a WLAN access point, a satellite, etc. that is in communication with server 190 via network 185. Thus, the communication infrastructure 180 can include, for example, long-range communication nodes (e.g., cellular base stations or communication satellites) and shorter-range communication nodes (e.g., WLAN access points) that are communicatively connected to the communication network 185. In one embodiment, the wireless communication link 170 can be, for example, a third-generation (3G) or fourth generation (4G) communication link. Communications between NAD 130 and shorter-range communication nodes are typically facilitated using IEEE 802.x or Wi-Fi®, Bluetooth®, or related or similar standards. Shorter-range communication nodes can be located, for example, in homes, public accommodations (coffee shops, libraries, etc.), and as road-side infrastructure such as by being mounted adjacent a highway or on a building in a crowded urban area.

The network 185 can include a wide area network, such as one or more of a cellular telephone network, the Internet, Voice over Internet Protocol (VoIP) networks, local area networks (LANs), wide area networks (WANs), personal area networks (PANs), and other communication networks. Communications from the NAD 130 to the remote server 190, and from the remote server 190 to the NAD 130, can traverse through the communication network 185.

The server 190 is a backend server (or servers) that include computer hardware for implementing the server 190 that can provide information/content that can then be communicated over a network 185, such as the Internet, to communication infrastructure 180. The server 190 can be a telematics server that provides services to the vehicle 102 such as Global Positioning System (GPS) services and theft prevention services, alert services and warning services. In some implementations, the server 190 can be associated with a commercial service (e.g., OnStar) that generates information and communicates it over the network 185 to communication infrastructure 180. The information/content provided by the server 190 can include, for example, vehicle control information, telematics information, diagnostic information, GPS information (or any type of information that indicates the location or position, speed, acceleration, heading, etc.). These are some non-limiting example of the types of information that can be generated at the server 190 and then communicated to the communication infrastructure 180. Communication infrastructure 180 then communicates that information or content from the server 190 over wireless communication link(s) 170 to a NAD 130. This way, the NAD 130 provides wireless connectivity to the server 190 over the wireless communication link 170.

The NAD 130 can then provide this information to a processor (not illustrated in FIG. 1) located in the vehicle 102 that processes the information from the server 190.

Figure 2:
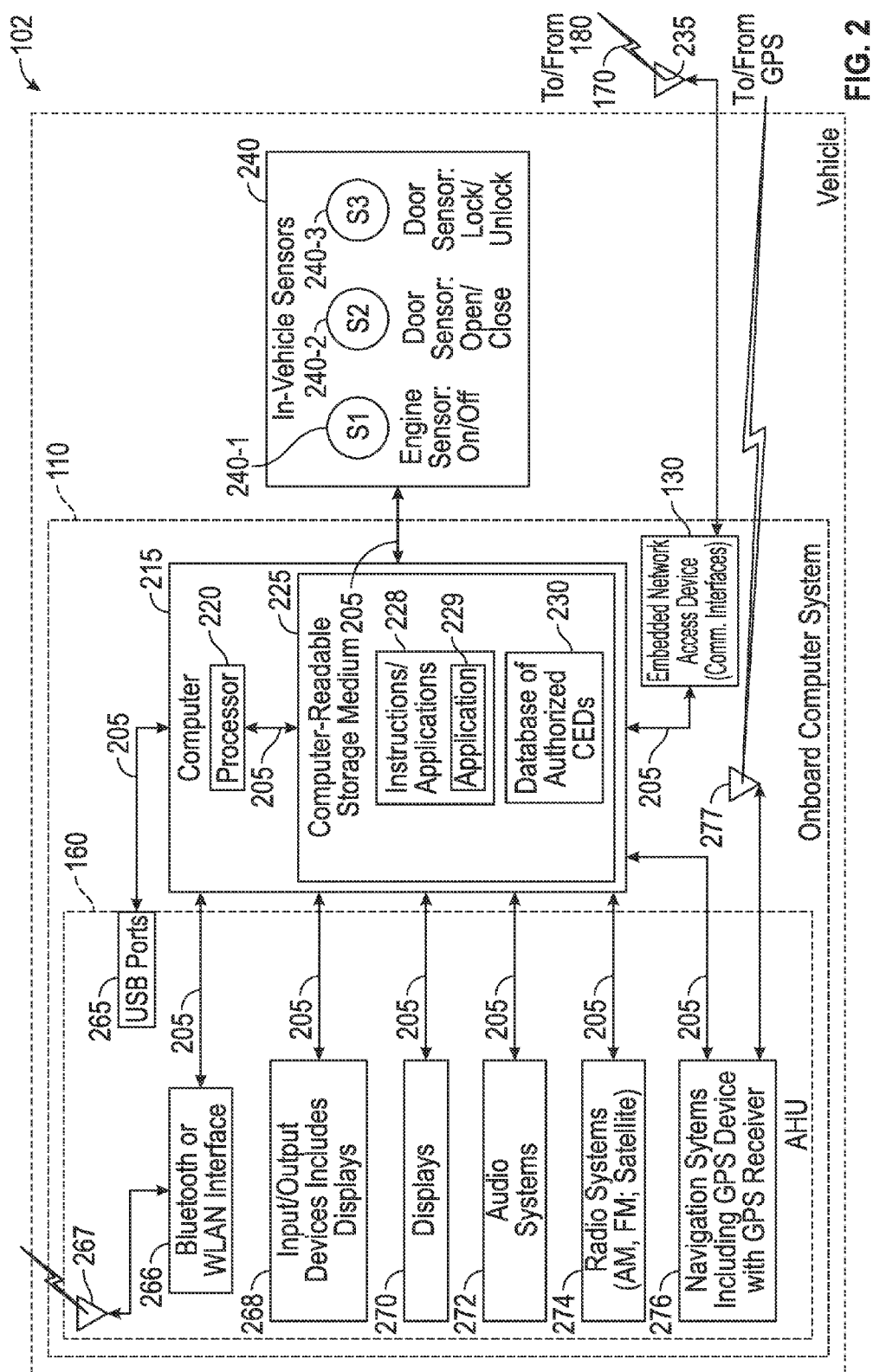
FIG. 2 is a diagram that illustrates a portion of a vehicle in accordance with one exemplary implementation of the disclosed embodiments.

Further details regarding this system 100 will now be described below with reference to FIGS. 2-6. FIG. 2 is a diagram that illustrates a portion of a vehicle 102 in accordance with one exemplary implementation of the disclosed embodiments. The vehicle 102 includes an onboard computer system 110, and vehicle sensors 240.

In the particular example that is illustrated in FIG. 2, the onboard computer system 110 includes the embedded NAD 130, the AHU 160 and a computer 215. The embedded NAD 130, the AHU 160 and the computer 215 are coupled to each other via one or more in-vehicle buses 205 that are illustrated in FIG. 2 by one or more bus line(s) 205. The bus 205 includes various wired paths that are used to interconnect the various systems and route information between and among the illustrated blocks of FIG. 2. As used herein, the bus 205 can include any internal vehicle bus including a Controller Area Network (CAN) bus. As is known in the art, a CAN bus is a vehicle bus standard designed to allow microcontrollers and devices to communicate with each other within a vehicle without a host computer. Among other things, a CAN bus allows electronic control units (ECUs) for various sub-systems, which are collectively represented by processor 220 in FIG. 2) to communicate with each other. For instance, the CAN bus can allow control units such as an engine control unit (also engine control module/ECM or Powertrain Control Module/PCM), transmission control unit, airbag control unit, antilock braking system (ABS) control unit, cruise control, electric power steering (EPS) control unit, audio systems, windows, doors, mirror adjustment, battery and recharging systems for hybrid/electric cars, etc. to communicate with one another.

Although the embedded NAD 130, the AHU 160 and the computer 215 are illustrated as being part of the onboard computer system 110, those skilled in the art will appreciate that the embedded NAD 130, the AHU 160 and the computer 215 (and the various sub-blocks thereof) can separate units that can be distributed throughout the vehicle 102. Thus, although certain blocks are indicated as being implemented with the onboard computer system 110, in other embodiments, any of these blocks can be implemented elsewhere within the vehicle 102 inside the onboard computer system 110.

The computer 215 includes at least one computer processor 220 that is in communication with a tangible, non-transitory processor-readable storage medium 225 (e.g., computer memory) by way of a communication bus 205 or other such computing infrastructure. The processor 220 is illustrated in one block, but may include various different processors and/or integrated circuits that collectively implement any of the functionality described herein. The processor 220 includes a central processing unit (CPU) that is in communication with the processor-readable storage medium 225, and input/output (I/O) interfaces that are not illustrated in FIG. 2 for sake of clarity. In some implementations, these I/O interfaces can be implemented at I/O devices 268, displays 270, and audio systems 272 that are shown within the AHU 160. An I/O interface (not illustrated) may be any entry/exit device adapted to control and synchronize the flow of data into and out of the CPU from and to peripheral devices such as input/output devices 268, displays 270, and audio systems 272.

As will be explained in greater detail below, the processor 220 can receive information from each of the other blocks illustrated in FIG. 2 (e.g., information provided over a bus within the vehicle or over wide area networks, such as the Internet, information such as video data, voice data, e-mail, information from diagnostics systems, information detected by the sensors 240, information provided by the navigation systems 276, etc.), process this information, and generate communications signals that convey selected information to any of the other blocks illustrated in FIG. 2.

The term processor-readable medium and variants thereof, as used in the specification and claims, refer to any known non-transitory computer storage media that can include any known form of computer-usable or processor-readable medium. The processor-readable (storage) medium 225 can be any type of memory technology including any types of read-only memory or random access memory or any combination thereof. For example, storage media could include any of random-access memory (RAM), read-only memory (ROM), electrically erasable programmable read-only memory (EEPROM), solid state memory or other memory technology, CD ROM, DVD, other optical disk storage, magnetic tape, magnetic disk storage or other magnetic storage devices, and any other medium that can be used to store desired data. The processor-readable (storage) medium 225 encompasses a wide variety of memory technologies that include, for example but not limited to, an electronic, magnetic, optical, electromagnetic, infrared, or semiconductor system, apparatus, device, or propagation medium. Some non-limiting examples can include, for example, volatile, non-volatile, removable, and non-removable memory technologies. For sake of simplicity of illustration, the processor-readable medium 225 is illustrated as a single block within computer 215; however, the processor-readable storage medium 225 can be distributed throughout the vehicle including in any of the various blocks illustrated in FIG. 2, and can be implemented using any combination of fixed and/or removable storage devices depending on the implementation.

The processor-readable storage medium 225 stores instructions 228 that, when executed by the processor, cause the processor 220 to perform various acts as described herein. The processor-readable storage medium 225 stores instructions 228 that can be loaded at the processor 220 and executed to generate information that can be communicated to the AHU 160 and any of the other blocks illustrated in FIG. 2. The instructions 228 may be embodied in the form of one or more programs or applications (not shown in detail) that may be stored in the medium 225 in one or more modules. While instructions 228 are shown generally as residing in/at the processor-readable storage medium 225, various data, including the instructions 228 are in some embodiments stored in a common portion of the storage medium, in various portions of the storage medium 225, and/or in other storage media.

The processor-readable storage medium 225 also a database 230 of authorized CEDs that includes identifier information for each CED that has been designated as "authorized" by the vehicle's owner. The term "authorized" when used with reference to a CED refers to a CED that has been designated by the owner as being associated with an individual who has permission to access, use and/or operate the vehicle. As will be described in greater detail below, the processor 220 can then use this information to determine whether a particular CED has been designated as authorized when it determines whether an authorized CED is connected to the wireless communication interface 266 of the AHU 160.

The AHU 160 includes various infotainment system components that make up an infotainment system that provides passengers in the vehicle 102 with information and/or entertainment in various forms including, for example, music, news, reports, navigation, weather, and the like, received by way of radio systems, Internet radio, podcast, compact disc, digital video disc, other portable storage devices, video on demand, and the like.

In the example implementation illustrated in FIG. 2, the AHU 160 includes ports 265 (e.g., USB ports), one or more interface(s) 266 (e.g., Bluetooth and/or Wireless Local Area Network (WLAN) interface(s)) that includes one or more associated antennas 267, one or more input and output devices 268, one or more display(s) 270, one or more audio system(s) 272, one or more radio systems 274 and optionally a navigation system 276 that includes a global positioning system receiver (not illustrated). The input/output devices 268, display(s) 270, and audio system(s) 272 can collectively provide a human machine interface (HMI) inside the vehicle.

The input/output devices 268 can be any device(s) adapted to provide or capture user inputs to or from the onboard computer 110. For example, a button, a keyboard, a keypad, a mouse, a trackball, a speech recognition unit, any known touchscreen technologies, and/or any known voice recognition technologies, monitors or displays 270, warning lights, graphics/text displays, speakers, etc. could be utilized to input or output information in the vehicle 102. Thus, although shown in one block for sake of simplicity, the input/output devices 268 can be implemented as many different, separate output devices 268 and many different, separate input devices 268 in some implementations. As one example, the input/output devices 268 can be implemented via a display screen with an integrated touch screen, and/or a speech recognition unit, that is integrated into the system 160 via a microphone that is part of the audio systems 272. As such, it is noted that the input/output devices 268 (that are not illustrated) can include any of a touch-sensitive or other visual display, a keypad, buttons, or the like, a speaker, microphone, or the like, operatively connected to the processor 220. The input can be provided in ways including by audio input. For instance, the onboard computer system 110 in some embodiments includes components allowing speech-to-data, such as speech-to-text, or data-to-speech, such as text-to-speech conversions.

The displays 270 can include any types and number of displays within the vehicle. For example, the displays 270 can include a visual display screen such as a navigation display screen or a heads-up-display projected on the windshield or other display system for providing information to the vehicle operator. One type of display may be a display made from organic light emitting diodes (OLEDs). Such a display can be sandwiched between the layers of glass (that make up the windshield) and does not require a projection system. The displays 270 can include multiple displays for a single occupant or for multiple occupants, e.g., directed toward multiple seating positions in the vehicle. Any type of information can be displayed on the displays 270 including information that is generated by the server 190 of FIG. 1.

The audio systems 272 can include speakers, microphones and other audio hardware and software components including voice-recognition software. The radio systems 274 can include any known types of radio systems including AM, FM and satellite based radio systems.

The navigation systems 276 can include a global positioning system (GPS) device for establishing a global position of the vehicle. The GPS device includes a processor and one or more GPS receivers that receive GPS radio signals via an antenna (not illustrated in FIG. 2). These GPS receivers receive differential correction signals from one or more base stations either directly or via a geocentric stationary or LEO satellite 195, an earth-based station (e.g., cellular base station) or other means. This communication may include such information as the precise location of a vehicle, the latest received signals from the GPS satellites 195 in view, other road condition information, emergency signals, hazard warnings, vehicle velocity and intended path, and any other information. The navigation systems 276 can also regularly receive information such as updates to the digital maps, weather information, road condition information, hazard information, congestion information, temporary signs and warnings, etc. from a server. The navigation systems 276 can include a map database subsystem (not illustrated) that includes fundamental map data or information such as road edges, the locations of stop signs, stoplights, lane markers etc. that can be regularly updated information with information from a server. The navigation systems 276 can receive information from various sensors (not illustrated) as is known in the art.

The ports 265 and interfaces 266 allow for external computing devices including the CED 135 to connect to the onboard computer system 110. In some embodiments, the ports 265 can include ports that comply with a USB standard, and interfaces 266 can include interfaces that comply with a Bluetooth and/or WLAN standards. This way, the CED 135 can directly communicate (transmit and receive) information with the onboard computer system 110. This information can include data, control information, audio information, video information, textual information, etc.

The embedded NAD 130 and its associated antenna(s) 235 can be integrated within the vehicle 102. The embedded NAD 130 can be communicatively coupled to various components of an onboard computer system 110 via a wireless or wired connection including via bus 205. For example, the computer 215 of the onboard computer system 110 is communicatively coupled to the embedded NAD 130 via one or more bus line(s) 205.

The NAD 130 can include at least one communication interface and at least one antenna 135, and in many cases can include a plurality of different communication interfaces. These communication interfaces can include one or more wireless communication interfaces that allow the embedded NAD 130 to communicate with communication infrastructure 180. The wireless communication interfaces of the embedded NAD 130 each include at least one transceiver having at least one receiver and at least one transmitter that are operatively coupled to at least one processor. The wireless communication interfaces that are included within the embedded NAD 130 can be implemented using any known wireless communications technologies. The embedded NAD 130 can use communication techniques that are implemented using multiple access communication methods including frequency division multiple access (FDMA), time division multiple access (TDMA), code division multiple access (CDMA), orthogonal frequency division multiple access (OFDMA) in a manner to permit simultaneous communication with communication infrastructure 180 of FIG. 1. While the embedded NAD 130 is illustrated in a single box, it will be appreciated that this box can represent multiple different wireless communication interfaces each of which can include multiple ICs for implementation of the receivers, transmitters, and/or transceivers that are used for receiving and sending signals of various types, including relatively short-range communications or longer-range communications, such as signals for a cellular communications network. The embedded NAD 130 is illustrated as being part of the onboard computer system 110, but can be implemented via one or more separate chipsets.

Depending on the particular implementation, the embedded NAD 130 can include any number of long range wireless communication interfaces and any number of short range wireless communication interfaces.

For example, the embedded NAD 130 can include wireless communication interfaces for relatively short-range communications that employ one or more short-range communication protocols, such as a dedicated short range communication (DSRC) system (e.g., that complies with IEEE 802.11p), a WiFi system (e.g., that complies with IEEE 802.11 a, b, g, IEEE 802.16, WI-FI®), BLUETOOTH®, infrared, IRDA, NFC, the like, or improvements thereof). The NAD 130 can include communication interfaces that allow for short-range communications with other devices (such as CED 135) and with other vehicles (not illustrated) (e.g., that allow the vehicle 102 to communicate directly with one or more other vehicles as part of an ad-hoc network without relying on intervening infrastructure, such as node 180). Such communications are sometimes referred to as vehicle-to-vehicle (V2V) communications.

Likewise, the embedded NAD 130 can include wireless communication interfaces for longer-range communications such as cellular and satellite based communications that employ any known communications protocols. In one embodiment, one of the wireless communication interfaces of the embedded NAD 130 is configured to communicate over a cellular network, such as a third generation (3G) or fourth generation (4G) cellular communication network.

The embedded NAD 130 can enable the vehicle to establish and maintain one or more wireless communications links 170 (e.g., via cellular communications, WLAN, Bluetooth, and the like). The physical layer used to implement these wireless communication links can be based on any known or later-developed wireless communication or radio technology.

As such, the wireless communication links 170 that are shown in FIGS. 1 and 2 can be implemented, for example, using one or more of Dedicated Short-Range Communications (DSRC) technologies, cellular radio technology, satellite-based technology, wireless local area networking (WLAN) or WI-FI® technologies such as those specified in the IEEE 802.x standards (e.g. IEEE 802.11 or IEEE 802.16), WIMAX®, BLUETOOTH®, near field communications (NFC), the like, or improvements thereof (WI-FI is a registered trademark of WI-FI Alliance, of Austin, Tex.; WIMAX is a registered trademark of WiMAX Forum, of San Diego, Calif.; BLUETOOTH is a registered trademark of Bluetooth SIG, Inc., of Bellevue, Wash.).

The embedded NAD 130 can perform signal processing (e.g., digitizing, data encoding, modulation, etc.) as is known in the art.

The vehicle sensors 240 are communicatively coupled to the onboard computer system 110 via bus 205 or other communication link, which in one implementation can be a Controller Area Network (CAN) bus.

The onboard computer 110 is configured for receiving, processing and transmitting information received from sensors 240 that are part of the vehicle 102. The sensors 240 can include any known types of sensors employed in vehicles. The sensors 240 may be adapted to transmit and receive digital and/or analog signals. Illustrative sensors include analog or digital sensors, mechanical property sensors, electrical property sensors, audio or video sensors, or any combination thereof.

In accordance with the disclosed embodiments, the sensors 240 include at least a first sensor 240-1 that is configured to detect or indicate the engine of the vehicle be started or shut off, a group of second sensors 240-2 each of which can detect whether doors of the vehicle have been opened or closed and generate an output signal that can be used to determine whether a door (or other compartment) of the vehicle has been opened, and a group of third sensors 240-3 that can each detect whether doors (or other compartments) of the vehicle have locked or unlocked and generate an output signal that can be used to determine whether a door of the vehicle has been unlocked. The sensors 240 can also include other sensors (not illustrated) that can detect and/or be used to indicate when the vehicle 102 has moved or is moving, such as a velocity sensor that provides an accurate measure of the vehicle velocity relative to the ground (e.g., a wheel speed sensor or radar velocity meter).

The AHU 160 is in communication with the processor 220 and includes at least one short-range wireless communication interface 266 (e.g., Bluetooth interface and/or WLAN interface) that is configured to establish a wireless connection (e.g., Bluetooth connection and/or WLAN connection) with the CED 135 when in communication range of the CED 135.

Figure 3:
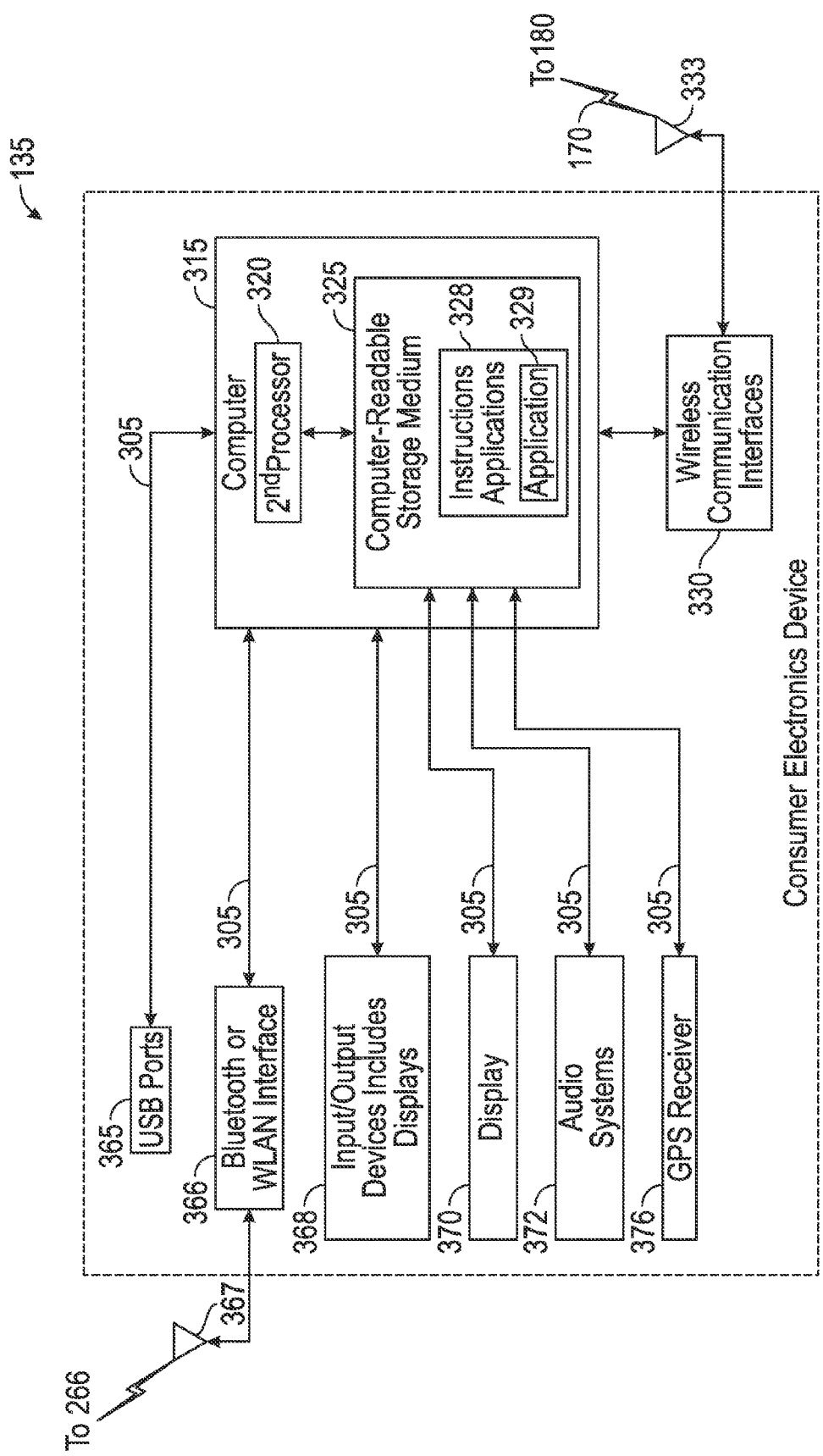
FIG. 3 is a diagram that illustrates a consumer electronics device (CED) in accordance with one example of the disclosed embodiments.

FIG. 3 is a diagram that illustrates a consumer electronics device (CED) 135 in accordance with one example of the disclosed embodiments. FIG. 3 will be described with respect to FIGS. 1 and 2.

The CED 135 includes a computer 315, one or more long-range wireless communication interfaces 330 (e.g., cellular interfaces), ports 365 (e.g., USB ports), at least one short-range wireless communication interface 366 (e.g., Bluetooth and/or Wireless Local Area Network (WLAN) interface(s)) that includes an antenna(s) 367, input/output devices 368, display(s) 370, an audio system(s) 372, and a GPS receiver 376. The various components of the CED are communicatively coupled via one or more bus line(s) 305.

The computer 315 includes at least one computer processor 320 that is in communication with a tangible, non-transitory processor-readable storage medium 325 (e.g., computer memory) by way of a communication bus 305 or other such computing infrastructure. The processor 320 is illustrated in one block, but may include various different processors and/ or integrated circuits that collectively implement any of the functionality described herein. The processor 320 can include a central processing unit (CPU) that is in communication with the processor-readable storage medium 325, and input/output (I/O) interfaces that are not illustrated in FIG. 3 for sake of clarity. In some implementations, these I/O interfaces can be implemented at I/O devices 368, displays 370, and audio systems 372. An I/O interface (not illustrated) may be any entry/exit device adapted to control and synchronize the flow of data into and out of the CPU from input/output devices 368, displays 370, and audio systems 372.

As will be explained in greater detail below, the processor 320 can receive information from each of the other blocks illustrated in FIG. 3, process this information, and generate communications signals that convey selected information to any of the other blocks illustrated in FIG. 3. The processor 325 of the CED 135 can perform signal processing (e.g., digitizing, data encoding, modulation, etc.) as is known in the art.

The processor-readable (storage) medium 325 can be any type of memory technology including any types described above with reference to processor-readable storage medium 225. The processor-readable storage medium 325 stores instructions 328 that, when executed by the processor, cause the processor 320 to perform various acts as described herein. The instructions 328 may be embodied in the form of one or more programs or applications (not shown in detail) that may be stored in the medium 325 in one or more modules. In accordance with the disclosed embodiments, the instructions 328 include an application 329 that will be described in greater detail below.

The input/output devices 368 can be any known types of devices adapted to provide or capture user inputs to or outputs from the computer 315 including any of those mentioned above with respect to input/output devices 268. The input/output devices 368 can include user controls such as buttons, switches and/or knobs that a user can use to interact with the processor 320, a keyboard, which can be used to enter text data to be stored or transmitted. The display 370 can be any known type of display (e.g., an LCD display, LEDs, etc.). The audio system(s) can include speakers, microphones, and a voice recognition processor. The input/output devices 368, display(s) 370, and audio system(s) 372 are known in the art and will not be described in detail herein.

The ports 365 and short-range wireless communication interfaces 366 allow for external computing devices (including the interfaces 266 of the vehicle) to wirelessly connect to and communicate with the computer 315. In some embodiments, the ports 365 can include ports that comply with a USB standard, and interfaces 366 can include interfaces that comply with Bluetooth and/or WLAN standards. This way, the CED 135 can directly communicate (transmit and receive) information including data, control information, audio information, video information, textual information, etc.

The CED 135 can include at least one long-range wireless communication interface 330 and at least one antenna 333, and in many cases can include a plurality of different long-range wireless communication interfaces. These long-range wireless communication interfaces can include one or more long-range wireless communication interfaces that allow the CED 135 to communicate with communication infrastructure 180.

In this regard, it is noted that each of the wireless communication interfaces 330, 366 can include at least one radio, wherein each radio includes at least one controller/processor for performing at least some of the functionality described below to carry out communications with other entities in the network, at least one transceiver including transmitter circuitry and receiver circuitry, an antenna, a program memory for storing operating instructions that are executed by the controller, as well as other components that are used to implement a communication interface as will be understood by those skilled in the art. In this regard, the wireless communication interfaces 330, 366 can each have their own transceiver that includes transmitter circuitry and receiver circuitry to communicate information packets to and acquire information packets from the other nodes or network entities within the communication network. In other embodiments, portions of the transmitter circuitry and receiver circuitry may be shared amongst the wireless communication interfaces. The transmitter circuitry and the receiver circuitry include circuitry to enable digital or analog transmissions over a communication channel. The implementations of the transmitter circuitry and the receiver circuitry depend on the implementation. For example, the transmitter circuitry and the receiver circuitry can be implemented as an appropriate modem, or as conventional transmitting and receiving components of communication devices. The modem can be internal to the CED 135 or insertable into the CED 135 (e.g., embodied in a wireless a radio frequency (RF) modem implemented on a Personal Computer Memory Card International Association (PCMCIA) card). The transmitter circuitry and the receiver circuitry are preferably implemented as part of the wireless device hardware and software architecture in accordance with known techniques. In some implementations, the receiver circuitry is capable of receiving RF signals from at least one frequency bandwidth and optionally more than one frequency bandwidth, if the communications with the proximate device are in a frequency band other than that of the network communications. The transceiver includes at least one set of transmitter circuitry. The at least one transmitter may be capable of transmitting to multiple devices over multiple frequency bands. As with the receiver, multiple transmitters may optionally be employed. In one implementation, one transmitter can be used for the transmission to a proximate node (e.g., interface 266) or direct link establishment, and other transmitters can be used for transmission to a cellular BS(s). Any one of the antennas 333, 367 can include any known or developed structure for radiating and receiving electromagnetic energy in the frequency range containing the wireless communication frequencies In some implementations, most, if not all, of the functions of the transmitter circuitry and/or the receiver circuitry, as well as the communication interfaces can be implemented in a controller, such as the processor 320. However, the processor 320 and the communication interfaces 330, 366 have been artificially partitioned herein to facilitate a better understanding. As such, boxes 330, 366 can represent multiple different wireless communication interfaces each of which can include multiple ICs for implementation of the receivers, transmitters, and/or transceivers.

The communication interfaces 330, 366 can each operate over a different protocol or radio protocol in a different frequency bandwidth. The communication interfaces 330, 366 may each have their own transceiver (not shown in FIG. 3). Each of these communication interfaces 330, 366 can support certain bandwidth requirements, communication range requirements, etc. Each communication interface 330, 366 operates at a data rate (or one of a set of data rates), and operates in a frequency band (or one of a set of frequency bands) having a bandwidth. The communication interfaces generate a modulated data stream, and can demodulate data using at least one demodulation technique to generate a demodulated data stream. Moreover, while the exemplary CED 135 shows two communication interfaces 330, 366, it will be appreciated that in other practical implementations additional communication interfaces (that are not shown) can be included.

Communication interface 330 can receive and send signals of various types, including relatively long-range communications, such as signals for a cellular communications network, such as a third generation (3G) or fourth generation (4G) cellular communication network. Each of the long-range wireless communication interfaces 330 can be implemented via one or more separate chipsets. The long-range wireless communication interfaces 330 that are included within the CED 135 can be implemented using any known wireless communications technologies including any of those mentioned above with reference to FIG. 2. For example, interface 330 can utilize any one of a number of different multiple access techniques such as Frequency Division Multiplexing (FDM), Time Division Multiplexing (TDM), Code Division Multiplexing (CDM), and others. Examples of multiple access schemes which can be used in the network can include any one or more of time division multiple access (TDMA), direct sequence or frequency hopping code division multiple access (CDMA), Global System for Mobile communication (GSM), Wide-band CDMA (WCDMA), Universal Mobile Telecommunications System (UMTS), frequency division multiple access (FDMA), orthogonal frequency division multiplexing (OFDM), opportunity division multiple access (ODMA), a combination of any of the foregoing multiple access technologies, a multiple access technology in which portions of the frequency spectrum to be used are determined by local signal quality measurements and in which multiple portions of the frequency spectrum may be used simultaneously, or any other multiple access or multiplexing methodology or combination thereof.

As noted above, the interface(s) implemented in block 366 can include a WLAN interface and/or a Bluetooth interface, which will both be referred to below using reference number 366.

The WLAN interface 366 is used for communication between the CED 135 and other WLAN-enabled devices. The WLAN interface 366 can be, for example, an ad hoc networking air interface, and in this exemplary embodiment is an IEEE 802.11 WLAN communication interface which complies with any of the IEEE 802.11 Standards and specifications (e.g., IEEE 802.11(a), (b), (g) or (n)). The WLAN interface 366 can also be any communication interface which complies with any of the other IEEE 802.11 Standards, any of the IEEE 802.16 Standards, or another wireless standard. For example, WLAN interface 366 can be a communication interface which complies with the IEEE 802.16e WiMax specifications. In some implementations, the WLAN interface 366 can be, for example, an ultrawide band (UWB) communication interface which implements a Multiple Input Multiple Output (MIMO) communication interface which operates using Orthogonal Frequency Division Multiplexing (OFDM) modulation techniques or other modulation techniques. Alternatively, it will be appreciated that the WLAN interface 366 can be a communication interface which complies with the IEEE 802.20 Mobile Broadband Wireless Access (MBWA) specifications for IP-based services.

The Bluetooth interface 366 includes a Bluetooth antenna 367 and a Bluetooth chipset having a Bluetooth controller and a host (not illustrated in FIG. 3) as defined in the any of the Bluetooth communication standards. The Bluetooth chipset generates signals to be transmitted via the Bluetooth antenna 367, and also receives signals such as those transmitted from the Bluetooth-enabled interface 266 of the vehicle 102 via Bluetooth antenna 267. The Bluetooth interface 366 is capable of implementing all known Bluetooth standards and protocols including a Bluetooth Low Energy (BLE) protocol.

Further, in one embodiment, the Bluetooth interface 366 (or alternatively the processor 320) includes a signal processing module that is configured to process or determine signal strength information from signals that are communicated from the Bluetooth interface 266 of the vehicle 102 to determine the proximity of the CED 135 to the vehicle 102 (e.g., to determine the approximate distance between the CED 135 and the Bluetooth interface 266 of the AHU 160). For example, in one embodiment, the signal processing module can determine/measure signal strength information (e.g., a received signal strength indicator (RSSI)) associated with signals received by the CED 135 and process the signal strength information (e.g., a RSSI) to determine the distance of the CED 135 from the vehicle. In one implementation, the signal processing module can generate a reporting message that includes the signal strength information and approximate distance of the CED 135 from the vehicle 102. In this regard, it is noted that RSSI is just one exemplary metric that can be used to determine distance from the vehicle 102. Alternatively, any other link quality indicators, such as a Bluetooth proximity profile, can be used to determine the distance between the Bluetooth-enabled CED 135 and the Bluetooth interface 366.

The CED 135 can be pre-paired with the onboard computer system 110. As used herein, the term "pre-paired," when used to describe a CED that is paired with the onboard computer system 110, refers to any CED that has been authorized to be paired with a wireless communication interface 266 of the vehicle 102 (e.g., meaning that it is pre-authorized to establish the wireless connection with the wireless communication interface 266 and exchange information with the onboard computer system 110). The pairing can be a unidirectional pairing (e.g., that only the AHU has knowledge of) or a bidirectional pairing (e.g., that both the AHU and the CED(s) have knowledge of). In some implementations, the server 190 can store a list of identifiers associated with paired CED (e.g., subscriber unit identifiers (SUIDs) or electronic serial numbers (ESNs) associated paired devices) that can be provided to the vehicle 102 on a regular basis. Any known means can be used to provide this list to the server 190 including, but not limited to, a secure online service that allows the list to be specified and sent to the vehicle 102. In other implementations, a user, such as the owner of the vehicle 102, can manually enter or scan a list of one or more CEDs into the onboard computer system 110 that are authorized to be paired with the AHU 160. In general, the owner of the vehicle 102 can pair any CED with the vehicle 102 that they choose.

The CED 135 can establish a wireless connection with the wireless communication interface 266 when it is within communication range of the wireless communication interface 266. In one embodiment, the wireless connection is a Bluetooth connection such that the pre-paired CED 135 can connect to the wireless communication interface 266 when it is within Bluetooth communication range.

Further, the CED 135 can also be associated with a person who has the owner's authorization to access the vehicle 102. In this context, the CED 135 can be an "authorized" CED which can mean that when connected to the wireless communication interface 266 of the vehicle 102, it is presumed an authorized person (or operator of that vehicle 102) that is permitted to access the vehicle 102 is present. In other words, when an authorized CED is connected to the wireless communication interface 266, it can be presumed that someone is present that has the owner's permission to access the vehicle 102. In this regard, it's noted that a CED can be a pre-paired CED, but not an authorized CED. Likewise, an authorized CED can be, but does not necessarily have to be, a pre-paired CED with the onboard computer system 110. As such, a particular CED can be pre-paired and authorized, pre-paired and not authorized, or authorized without being pre-paired.

Application Software

In accordance with the disclosed embodiments, when the CED 135 is a "master" CED associated with an owner of a vehicle 102, the instructions 328 stored in/on the non-transitory processor-readable storage medium 325 can include an application 329 (that includes processor-executable instructions executable by a processor, such as, the processor 320). As used herein, the term "master," when used with reference to a CED, refers to a CED that is associated with an owner of the vehicle. Here, the "owner" of the vehicle can refer to someone else that the owner of the vehicle has designated as having master status (e.g., has permission to control which CEDs are given authorized status and therefore permitted to access the vehicle). As will be described below, when a master CED is present within and/or connected to a particular vehicle, and the vehicle is accessed it can be assumed that someone having permission to access that particular vehicle is present and/or is accessing that particular vehicle.

In one embodiment, the processor 320 executes the application 329 in response to receiving an indication that the vehicle 102 has been accessed and that an authorized CED has not connected to the wireless communication interface 266 of the vehicle 102. As used herein, the term "accessed" or variants thereof, when used with reference to a vehicle, means that the vehicle has been unlocked, entered, started and/or moved/driven. For instance, in one implementation, the onboard computer 110 can detect that a vehicle has been accessed based on information from sensors 240. This information can indicate one or more of the following: a door or trunk has been unlocked or opened, the vehicle has started, and that the vehicle has started moving. As used herein, the term "authorized" when used with reference to a CED refers to a CED that has been designated by the owner as being associated with an individual who has permission to access, use and/or operate the vehicle. An authorized CED can be any CED that is associated with an authorized person who has been designated as having permission to access a particular vehicle. In one implementation, an authorized CED can also be pre-paired with a wireless communication interface 266 of the onboard computer 110 of the vehicle 102. Any CED that is not a master CED or an authorized CED can be presumed to not be associated with an individual who has permission to access the vehicle. As used herein, the term "unauthorized" when used with reference to a CED refers to a CED that has not been designated by the owner as being associated with an individual who has permission to access the vehicle 102.

The description of the application 329 that follows will reference certain modules of the processor-executable instructions. The modules include at least at first module and can include a second module, which are not illustrated in FIG. 3.

Each time first GPS coordinates of the vehicle 102 are received from the vehicle 102 via a server 190, the first module can be executed by the processor 320 of the master CED to compute a separation distance between vehicle 102 and the master CED based on a difference between the first GPS coordinates and second GPS coordinates of the master CED.

The first module can then determine whether a separation distance between the vehicle 102 and the master CED is less than a threshold. When the separation distance 610 is determined to be greater than or equal to the threshold, the first module can send a notification message to a human machine interface (e.g., a display 370 and/or audio system 372) of the master CED to notify owner of the vehicle 102 that their vehicle 102 has been accessed and that an authorized CED has not established a wireless connection with an interface 266 of the vehicle 102. In some implementations, the first module can also send a warning message to the server 190 indicating that the vehicle 102 has been accessed and that an authorized CED has not connected to vehicle 102.

In some implementations, the second module can generate and present a query at the human machine interface (e.g., a display 370 and/or audio system 372) of the master CED requesting an authorization input from the owner. This authorization input can be either an affirmative input to indicate that an authorized person has accessed the vehicle 102, or a negative input to indicate that an unauthorized person has accessed the vehicle 102. In response to the negative input the second module can generate and present a query at the human machine interface (e.g., a display 370 and/or audio system 372) of the master CED requesting another input from the owner comprising either: a second affirmative input to indicate that authorities should be contacted, or a second negative input to indicate that authorities should not be contacted. In response to the second affirmative input, the second module can generate and send a request message either directly to the authorities, or to the server 190 to contact the authorities, to report that the vehicle 102 is being accessed by an unauthorized person and/or missing. The request message can include information including, for example, the vehicle 102 identification number (VIN), a license plate number of the vehicle 102, "GPS information" for the vehicle 102, etc. As used herein, the term "GPS information" includes one or more of the following: GPS coordinates, GPS heading, GPS speed, GPS acceleration, GPS timestamp for last good read, GPS most recent coordinates before loss of connection.

Further details regarding the disclosed embodiments will now be described below with reference to FIGS. 4-6.

Figure 4:
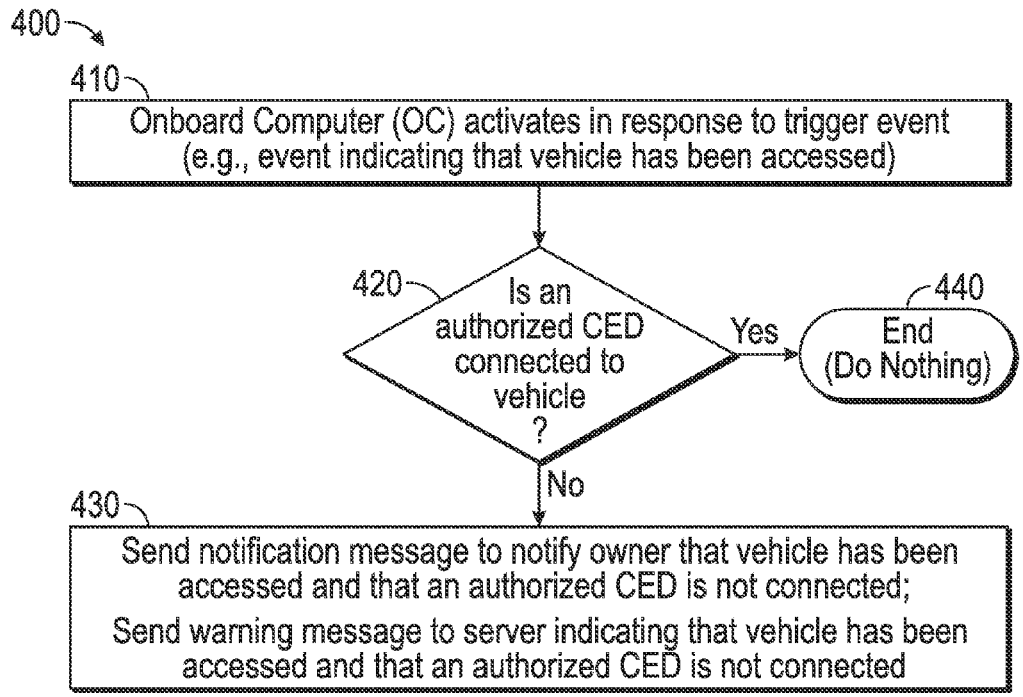
FIG. 4 is a flowchart illustrating a method for notifying an owner of a vehicle that their vehicle has been accessed by an unauthorized person and reporting the same to a server in accordance with some of the disclosed embodiments.

FIG. 4 is a flowchart illustrating a method 400 for notifying an owner of a vehicle 102 that the vehicle 102 has been accessed by an unauthorized person and reporting the same to a server 190 in accordance with some of the disclosed embodiments. The method of FIG. 4 will be described with reference to FIGS. 1-3 and 6. Prior to describing FIG. 4, a brief description of FIG. 6 will first be provided since reference numerals used in FIG. 6 are also used in the description of FIGS. 4 and 5.

Figure 6:
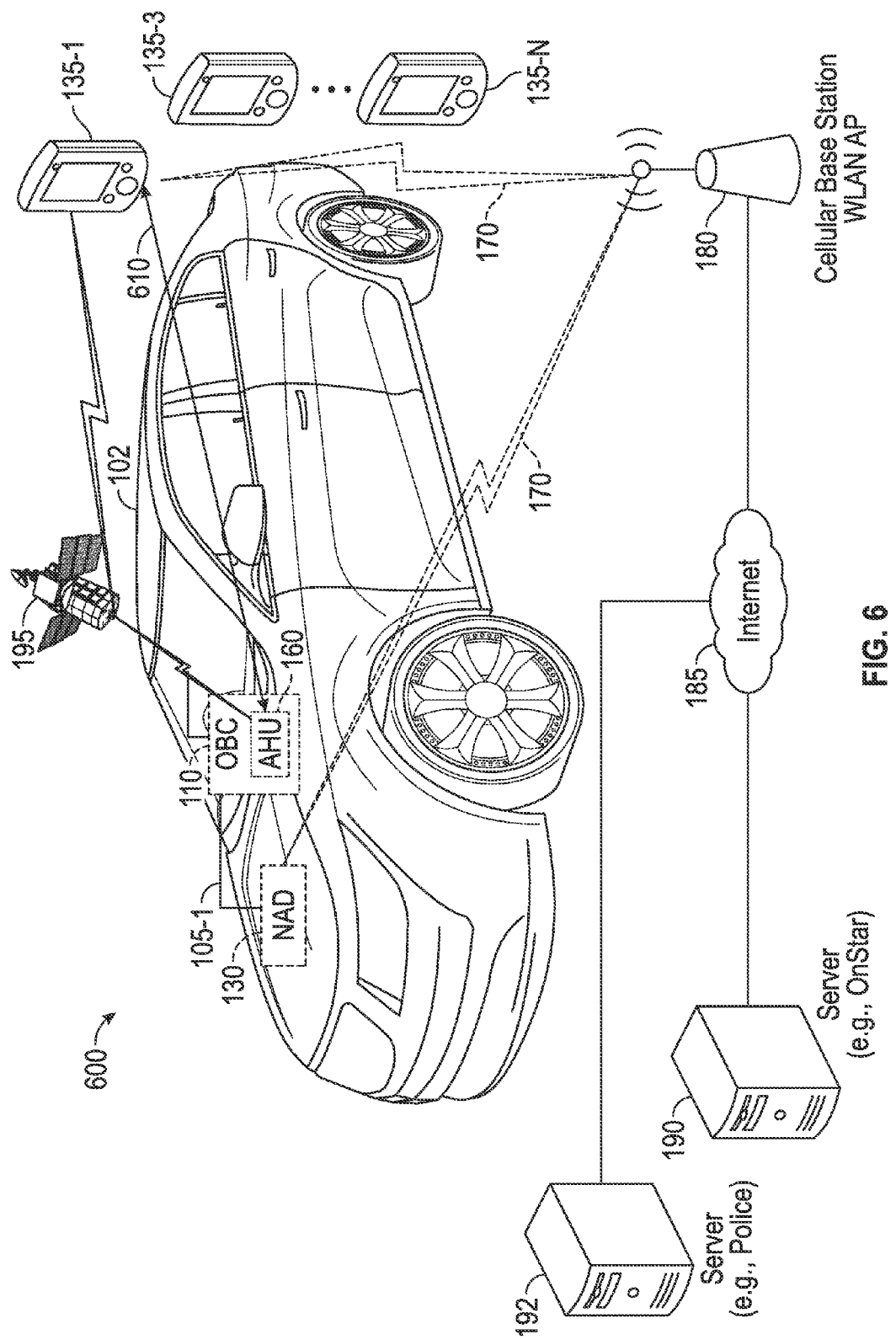
FIG. 6 illustrates an example of a communication system in which a master CED is located away from a vehicle such that it is not connected to a wireless communication interface of the vehicle.

FIG. 6 illustrates an example of a communication system 600 similar to that illustrated in FIG. 1, but illustrates a situation in which a master CED 135-1 is located away from the vehicle 102 such that it is not within the vehicle 102 and not connected to a wireless communication interface 266 of the AHU 160 of the onboard computer system 110. FIG. 6 also illustrates a group of authorized CEDs 135-3 . . . 135-N that are remotely located with respect to the vehicle 102 and not connected to a wireless interface of the onboard computer system 110 of the vehicle 102. Notably, in FIG. 6 a situation is shown in which no authorized CED is connected to wireless interface of the onboard computer system 110 of the vehicle 102. FIG. 6 is merely one, non-limiting example for purposes of illustration only, and is not intended to limit the situations in which the disclosed embodiments can be implemented. For sake of brevity the elements of FIG. 6 that share common numbering with FIG. 1 will not be described in detail again. In addition, the master CED 135-1 and the authorized CEDs 135-3 . . . 135-N can include any of the features described above with reference to FIGS. 1 through 3.

Referring again to FIG. 4, as a preliminary matter, it should be understood that steps of the method 400 are not necessarily presented in any particular order and that performance of some or all the steps in an alternative order is possible and is contemplated. The steps have been presented in the demonstrated order for ease of description and illustration. Further, steps can be added, omitted, and/or performed simultaneously without departing from the scope of the appended claims. It should also be understood that the illustrated method 400 can be ended at any time. In certain embodiments, some or all steps of this process, and/or substantially equivalent steps, are performed by execution of processor-readable instructions stored or included on a processor-readable medium, for example. For instance, references to a processor performing functions of the present disclosure refer to any one or more interworking computing components executing instructions, such as in the form of an algorithm, provided on a processor-readable medium, such as a memory associated with the processor of the onboard computer system 110 of vehicle 102, of the remote server 190, and/or of a CED 135 including a master CED 135-1.

The method 400 begins at block 410, when an onboard computer system 110 of a vehicle 102 is activated in response to a trigger event. As used herein, the terms "activate" and "activated" when used with reference to an onboard computer means that it has been switched from a standby state (e.g., inactive or in sleep mode waiting for a trigger) to an active state (e.g., fully enabled state). For instance, in one implementation, the onboard computer system 110 can be activated when an indication is received by a processor 220 indicating that the vehicle 102 has been accessed (e.g., a sensor 240-1 indicates that the vehicle has started, a sensor (not shown) indicates that the vehicle 102 has started moving, a sensor 240-2 indicates that the door has been opened, a sensor 240-3 indicates that the door has been unlocked, and/or a sensor (not shown) indicates that the trunk or other compartment of the vehicle 102 has opened, etc.).

The method 400 can then proceed to block 420, where the processor 220 within the onboard computer system 110 can determine whether an authorized consumer electronics device (CED) has connected to the wireless communication interface 266 of the AHU 160. In an alternative embodiment, the onboard computer system 110 can determine whether an authorized consumer electronics device (CED) is present within the vehicle by comparing GPS position of the vehicle to GPS positions of all authorized CEDs that are associated with the vehicle, and then determine whether any authorized CED has a GPS position within a threshold distance of the GPS position of the vehicle.

When it is determined that an authorized CED has not connected to the wireless communication interface 266 (or alternatively present within the vehicle), the method 400 can then proceed to block 430, where the processor 220 within the onboard computer system 110, for example, can generate and communicate a notification message, intended for the owner of the vehicle 102, that indicates that the vehicle 102 has been accessed by an unauthorized person and that an authorized CED has not connected to the wireless communication interface 266. In some embodiments, the notification message can include additional information such as an indication of whether the vehicle is moving, how fast it is moving, in what direction it is moving, etc. In addition, at block 430, the processor 220 within the onboard computer system 110 can also generate and communicate a warning message to a server (e.g., one or both of the servers 190, 192 of FIGS. 1 and 6). This warning message can also indicates that the vehicle 102 has been accessed (and/or is moving) and that an authorized CED has not connected to the wireless communication interface 266. In some embodiments, the warning message can include additional information such as an indication of whether the vehicle is moving, how fast it is moving, in what direction it is moving, etc.

When it is determined (at 420) that an authorized CED (e.g., such as master CED 135-1, or authorized CEDs 135-3 . . . 135-N) has connected to the wireless communication interface 266, the method 400 can then proceed to block 440, where the method 400 ends.

Figure 5:
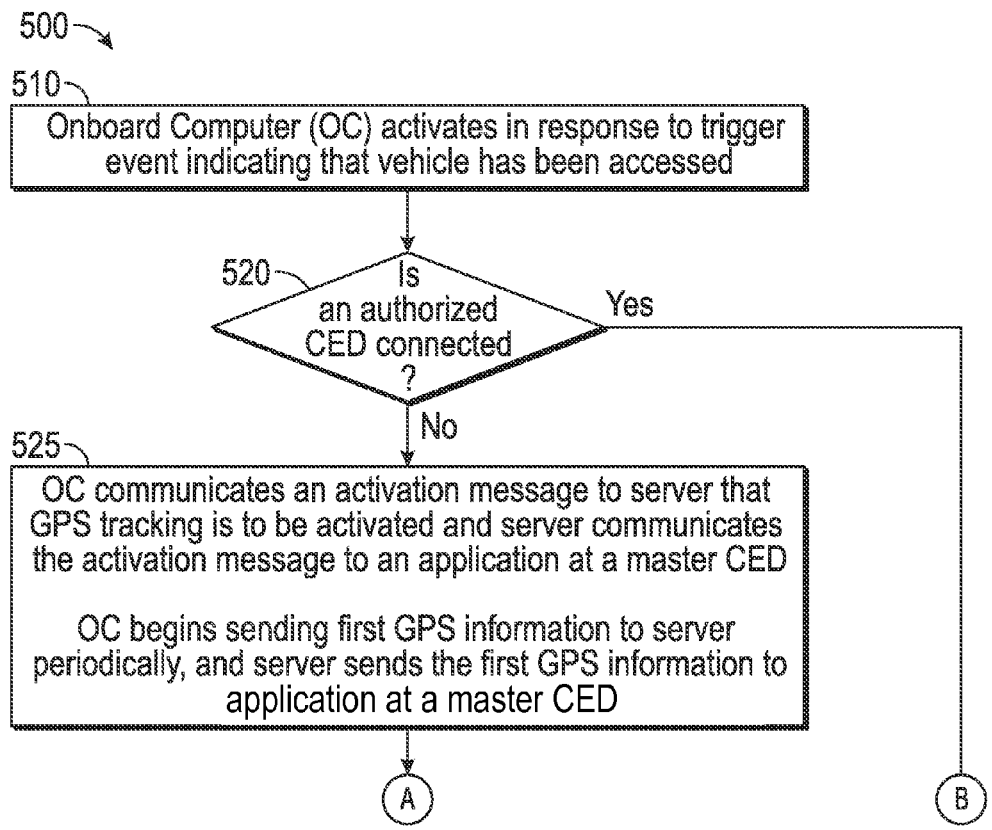
FIG. 5 is a flowchart illustrating a method for notifying an owner of a vehicle that their vehicle has been accessed by an unauthorized person and reporting the same to a server in accordance with one implementation of some of the disclosed embodiments.

FIG. 5 is a flowchart illustrating a method 500 for notifying an owner of a vehicle 102 that the vehicle 102 has been accessed by an unauthorized person and reporting the same in accordance with one implementation of some of the disclosed embodiments. The method of FIG. 5 will be described with reference to FIGS. 1-3 and 6. It should be understood that steps of the method 500 are not necessarily presented in any particular order and that performance of some or all the steps in an alternative order is possible and is contemplated. The steps have been presented in the demonstrated order for ease of description and illustration. Further, steps can be added, omitted, and/or performed simultaneously without departing from the scope of the appended claims. It should also be understood that the illustrated method 500 can be ended at any time. In certain embodiments, some or all steps of this process, and/or substantially equivalent steps, are performed by execution of processor-readable instructions stored or included on a processor-readable medium, for example. For instance, references to a processor performing functions of the present disclosure refer to any one or more interworking computing components executing instructions, such as in the form of an algorithm, provided on a processor-readable medium, such as a memory associated with the processor of the onboard computer system 110 of vehicle 102, of the remote server 190, and/or of a master CED 135-1.

The method 500 begins at block 510, when an onboard computer system 110 of a vehicle 102 is activated in response to a trigger event. For instance, in one implementation, the onboard computer system 110 can be activated when an indication is received by the processor 220 within the onboard computer system 110 that the vehicle 102 doors have been unlocked or opened, that the vehicle 102 has started, and/or that the vehicle 102 has started moving (e.g., sensors indicate that the door has been unlocked or opened, that the vehicle has started and/or that the vehicle 102 has started moving). In this implementation, the trigger event can be receiving an indication at the processor 220 that the vehicle 102 has been accessed.

The method 500 can then proceed to block 520, where the processor 220 within the onboard computer system 110 can determine whether an authorized consumer electronics device (CED) has connected to a wireless interface 266 of vehicle 102 (and/or is present within the vehicle 102). For example, the processor 220 can determine whether an authorized CED has connected to the wireless communication interface 266 by determining whether there is a short-range wireless connection (e.g., a Bluetooth connection) between a wireless interface 266 of the onboard computer system 110 and an authorized CED.

When it is determined (at 520) that an authorized CED has connected to the wireless communication interface 266, the method 500 can then proceed to block 590, where the method 500 ends.

When an authorized CED that is associated with an authorized person has not connected to the wireless communication interface 266 it can be assumed that an unauthorized person has accessed the vehicle 102 and, at block 525, the processor 220 within the onboard computer system 110 generates and communicates an activation message to a server 190 (via embedded NAD 130 or wireless communication interface 266) that indicates that GPS tracking of the vehicle 102 and the master CED 135-1 is to be activated to start GPS tracking, and the server 190 communicates (via infrastructure 180) the activation message (or another message) to an application 329 at the master CED 135-1 (that is associated with the owner of the vehicle 102). Again, this activation message indicates to the application 329 that GPS tracking of the master CED 135-1 is to be activated. After communicating the activation message, the processor 220 within the onboard computer system 110 starts periodically sending first GPS information that includes at least "first" GPS coordinates of the vehicle 102 to the server 190, and each time the server 190 receives the first GPS coordinates, the server 190 forwards the first GPS coordinates to the application 329 that is running/executing at the master CED 135-1.

After activating GPS tracking at the master CED 135-1, at block 530, a processor 320 at the master CED 135-1 periodically determines second GPS information that includes at least the "second" GPS coordinates of the master CED 135-1. Each time the application 329 executing at the master CED 135-1 receives the first GPS coordinates from the server 190, the application 329 computes a separation distance 610 between vehicle 102 and the master CED 135-1 based on a difference between the first GPS coordinates and the second GPS coordinates.

At block 540, the application 329 executing at the processor 320 of the master CED 135-1 determines whether the separation distance 610 between the vehicle 102 and the master CED 135-1 is less than a threshold that corresponds to a maximum allowable proximity range or maximum permissible location separation between the vehicle 102 and the master CED 135-1. As described above, when the application 329 executing at the master CED 135-1 determines that the separation distance 610 between the vehicle 102 and the master CED 135-1 is greater than or equal to the threshold, this means that the master CED 135-1 and the vehicle 102 are not in the same location (e.g., that the vehicle 102 is outside an allowable proximity range of the master CED 135-1 such that the location separation between the master CED 135-1 and the vehicle 102 is greater than the owner anticipated and is willing to allow without his/her approval).

When the application 329 executing at the master CED 135-1 determines that the separation distance 610 between the vehicle 102 and the master CED 135-1 is greater than or equal to the threshold, this means that the master CED 135-1 and the vehicle 102 are not in the same location (e.g., that the vehicle 102 is outside an allowable proximity range of the master CED 135-1 such that the location separation between the master CED 135-1 and the vehicle 102 is greater than the owner anticipated and is willing to allow without his/her approval). As such, when the application 329 executing at the master CED 135-1 determines that the separation distance 610 between the vehicle 102 and the master CED 135-1 is greater than or equal to the threshold, at block 550, the application 329 can send a notification to a human machine interface of the master CED 135-1 (e.g., as a message on a display 370 and/or as an audible signal over a speaker of audio system 372, etc.) to notify owner of the vehicle 102 that vehicle 102 has been accessed and that an authorized CED has not connected, and can also send a warning message to the server 190 indicating that the vehicle 102 has been accessed and that an authorized CED has not connected.

In some embodiments, the server 190 can then send the warning message to other devices (e.g., to another computer such as a laptop, tablet computing device, etc.) associated with the owner (e.g., via e-mail; automated telephone calls; text) to notify owner of the vehicle 102 that vehicle 102 has been accessed and that an authorized CED has not connected to vehicle 102.

When the application 329 executing at the master CED 135-1 determines that the separation distance 610 between the vehicle 102 and the master CED 135-1 is less than the threshold, the method 500 can proceed to block 590, where the method 500 ends.

Following block 550, the method 500 can proceed to block 560 or block 570. In other words, block 560 is optional and not performed in all implementations. An embodiment in which block 570 is performed will be described below, but in other implementations, when block 560 is not performed, the method 500 can proceed to block 570 without performing processing at block 560.

After communicating the notification message intended for the owner of the vehicle 102, the application 329 executing at the master CED 135-1 can generate, at block 560, a query requesting an authorization input from the owner. The query is presented to the owner of the vehicle 102 at a human machine interface of the master CED 135-1 (and possibly at other devices associated with the owner that have been designated). The authorization input from the owner can be either an affirmative input to indicate to a service at a server 190 that an authorized person has accessed the vehicle 102, or a negative input to indicate to the service at the server 190 that an unauthorized person has accessed the vehicle 102. For example, when the owner inputs a negative input, the method 500 can proceed to optional block 570.

At block 570, the application 329 executing at the master CED 135-1 can generate another query requesting another input from the owner, and present the query at the human machine interface. This input can be either a second affirmative input to indicate to the service at the server 190 that authorities should be contacted (e.g., when the owner believes that someone has accessed the vehicle 102 without the owner's permission, and may be attempting to do something to their vehicle 102 such as steal it or something inside it, vandalize it, etc.), or a second negative input to indicate to the service at the server 190 that authorities should not be contacted (e.g., when the owner believes that someone has accessed the vehicle 102 with the owner's permission, but does not have an authorized CED with them).

When the owner inputs the second affirmative input, at block 580, the application 329 executing at the master CED 135-1 can generate and send a request message to the server 190 to contact the authorities (e.g., to report the vehicle 102 as missing and/or request that the authorities search for the vehicle 102, etc.). Depending on the implementation, the request message can include additional information that will help the authorities identify or locate the vehicle 102. In some implementations, the request message can include information at least one of: a vehicle identification number (VIN), a license plate number of the vehicle 102, and the color, make and model of the vehicle 102, and/or location information that helps locate the vehicle 102 including but not limited to any of the second GPS information for the vehicle 102 (e.g., the current GPS coordinates, speed, heading, etc.), etc.

Although not illustrated in FIG. 5, following block 580, the server 190 will continue to receive the second GPS information for the vehicle 102 (i.e., the current GPS coordinates, speed, heading, etc.), and continue to forward the second GPS information to the authorities until the vehicle 102 is recovered, or some other trigger event occurs to stop sending the second GPS information when it is no longer needed. By contrast, when the owner inputs the second negative input, the method 500 can proceed to block 590, where the method 500 ends.

The foregoing description has been presented for purposes of illustration and description, but is not intended to be exhaustive or limit the scope of the claims. The embodiments described above are described to best explain one practical application, and to enable others of ordinary skill in the art to understand the invention for various embodiments with various modifications as are suited to the particular use contemplated.

In some instances, well-known components, systems, or methods have not been described in detail in order to avoid obscuring the present disclosure. Therefore, specific operational and functional details disclosed herein are not to be interpreted as limiting, but merely as a representative basis for teaching one skilled in the art.

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the description above includes a general context of processor-executable instructions, the present disclosure can also be implemented in combination with other program modules and/or as a combination of hardware and software.

The terms "application," "algorithm," "program," "instructions," or variants thereof, are used expansively herein to include routines, program modules, programs, components, data structures, algorithms, and the like, as commonly used. These structures can be implemented on various system configurations, including single-processor or multiprocessor systems, microprocessor-based electronics, combinations thereof, and the like. Although various algorithms, instructions, etc. are separately identified herein, various such structures may be separated or combined in various combinations across the various computing platforms described herein.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

The block diagrams in the Figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. It will also be noted that each block of the block diagrams and/or flowchart illustration, and combinations of blocks in the block diagrams can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

The detailed description provides those skilled in the art with a convenient road map for implementing the exemplary embodiment or exemplary embodiments. Many modifications and variations will be apparent to those of ordinary skill in the art without departing from the scope and spirit of the invention.

The above-described embodiments are merely exemplary illustrations of implementations set forth for a clear understanding of the principles of the disclosure. The exemplary embodiments are only examples, and are not intended to limit the scope, applicability, or configuration of the disclosure in any way. While exemplary embodiments have been presented in the foregoing detailed description, it should be appreciated that a vast number of variations exist. Variations, modifications, and combinations may be made to the above-described embodiments without departing from the scope of the claims. For example, various changes can be made in the function and arrangement of elements without departing from the scope of the disclosure as set forth in the appended claims and the legal equivalents thereof. All such variations, modifications, and combinations are included herein by the scope of this disclosure and the following claims.

What is claimed is:

1. A method for providing a notification that a vehicle has been accessed by an unauthorized person, the method comprising:
    activating an onboard computer system of a vehicle in response to a trigger event indicating that the vehicle has been accessed, the onboard computer system comprising a wireless communication interface;
    determining whether an authorized consumer electronics device (CED), that is associated with an authorized person, is connected to the wireless communication interface; and
    when the authorized CED is not connected to the wireless communication interface, communicating a notification message to a master CED associated with an owner of the vehicle, wherein the notification message indicates that the vehicle has been accessed and that the authorized CED has not connected to the wireless communication interface.

2. A method according to claim 1, further comprising:
    when it is determined that the authorized CED has not connected to the wireless communication interface, communicating a warning message to a server, wherein the warning message indicates that the vehicle has been accessed and that the authorized CED has not connected to the wireless communication interface.

3. A method according to claim 1, further comprising:
    when the authorized CED has not connected to the wireless communication interface:
    communicating, from the onboard computer system via a server, an activation message to an application at the master CED associated with an owner of the vehicle, wherein the activation message indicates to the application that Global Positioning System (GPS) tracking of the vehicle has been activated;
    after communicating the activation message, periodically sending, from the onboard computer system, first GPS information comprising first GPS coordinates of the vehicle to the server, and each time the server receives the first GPS coordinates forwarding the first GPS coordinates to the application at the master CED.

4. A method according to claim 3, further comprising:
    after activating GPS tracking at the master CED, periodically determining second GPS information comprising second GPS coordinates of the master CED; and
    each time the application at the master CED receives the first GPS coordinates from the server,
    computing, at the application executing at the master CED, a separation distance between vehicle and the master CED based on a difference between the first GPS coordinates and the second GPS coordinates; and
    determining, at the application executing at the master CED, whether the separation distance between the vehicle and the master CED is less than a threshold.

5. A method according to claim 3, wherein the step of communicating a notification message, comprises:
    when the application executing at the master CED determines that the separation distance between the vehicle and the master CED is greater than or equal to the threshold:
    sending the notification message from the application to a human machine interface of the master CED to indicate that vehicle has been accessed and that the authorized CED has not connected to vehicle.

6. A method according to claim 3, further comprising:
    when the application executing at the master CED determines that the separation distance between the vehicle and the master CED is greater than or equal to the threshold:
    sending the warning message from the application to the server indicating that the vehicle has been accessed and that the authorized CED has not connected to vehicle.

7. A method according to claim 6, further comprising:
    sending, from the server, the warning message to other devices associated with the owner to indicate that vehicle has been accessed and that the authorized CED has not connected to vehicle.

8. A method according to claim 1, after communicating the notification message, further comprising:
    generating a query via an application executing at the master CED, and presenting the query to an owner of the vehicle at a human machine interface, wherein the query requests an input from the owner, wherein the input comprises either an affirmative input to indicate to a service at a server that authorities should be contacted, or a negative input to indicate to the service at the server that authorities should not be contacted; and
    in response to the affirmative input, sending a request message to the server to contact the authorities to report the vehicle as missing, wherein the request message indicates at least one of a vehicle identification number (VIN), a license plate number of the vehicle, and the second GPS information for the vehicle.

9. A method according to claim 1, after communicating the notification message, further comprising:
    generating, via an application executing at the master CED, a query requesting an authorization input from an owner of the vehicle, and presenting the query to the owner at a human machine interface, wherein the authorization input comprises either an affirmative input to indicate to a service at a server that an authorized person has accessed the vehicle, or a negative input to indicate to the service at the server that an unauthorized person has accessed the vehicle; and in response to the negative input:

generating another query, via the application executing at the master CED, requesting an input from the owner, and presenting the query at a human machine interface, wherein the input comprises either: a second affirmative input to indicate to the service at the server that authorities should be contacted, or a second negative input to indicate to the service at the server that authorities should not be contacted; and in response to the second affirmative input, sending a request message to the server to contact the authorities to report the vehicle as missing, wherein the request message indicates at least one of a vehicle identification number (VIN), a license plate number of the vehicle, and the second GPS information for the vehicle.

10. A system, comprising:

a vehicle comprising an onboard computer system comprising a wireless communication interface, wherein the onboard computer system is configured to:

determine, in response to a trigger event indicating that the vehicle has been accessed, whether an authorized consumer electronics device (CED), that is associated with an authorized person, has connected to the wireless communication interface, and communicate, when the onboard computer system determines that the authorized CED has not connected to the wireless communication interface, a notification message to a master CED associated with an owner of the vehicle, wherein the notification message indicates that the vehicle has been accessed and that the authorized CED has not connected to the wireless communication interface.

11. A system according to claim 10, further comprising:

a server; and when the authorized CED is not connected to the wireless communication interface, wherein the onboard computer system is further configured to:

communicate a warning message to the server, wherein the warning message indicates that the vehicle has been accessed and that the authorized CED has not connected to the wireless communication interface.

12. A system according to claim 11, wherein the master CED comprises a processor configured to execute an application, and further comprising:

when the authorized CED is not connected to the wireless communication interface, wherein the onboard computer system is further configured to:

communicate an activation message to the application via the server, wherein the activation message indicates that GPS tracking of the vehicle has been activated, and wherein the onboard computer system is configured to periodically send first GPS information comprising first GPS coordinates of the vehicle to the server, and wherein the server is configured to forward the first GPS coordinates to the application each time the server receives the first GPS coordinates.

13. A system according to claim 12, wherein the master CED is configured to periodically determine, after activating GPS tracking at the master CED, second GPS information comprising second GPS coordinates of the master CED, wherein the application executing at the processor of the master CED is configured to compute, each time the application at the master CED receives the first GPS coordinates from the server, a separation distance between vehicle and the master CED based on a difference between the first GPS coordinates and the second GPS coordinates, and to determine whether the separation distance between the vehicle and the master CED is less than a threshold.

14. A system according to claim 12, when the application executing at the processor of the master CED determines that the separation distance between the vehicle and the master CED is greater than or equal to the threshold, wherein the application executing at the processor of the master CED is configured to send:

the notification message to a human machine interface of the master CED to notify the owner of the vehicle that vehicle has been accessed and that the authorized CED has not connected to vehicle; and the warning message to the server indicating that the vehicle has been accessed and that the authorized CED has not connected to vehicle; and wherein the server is further configured to send the warning message to other devices associated with the owner to notify the owner of the vehicle that vehicle has been accessed and that the authorized CED has not connected to vehicle.

15. A system according to claim 10, wherein, after communicating the notification message, an application executing at the processor of the master CED is further configured to:

generate and present a query to an owner of the vehicle at a human machine interface requesting an input from the owner, wherein the input comprises either an affirmative input to indicate to a service at a server that authorities should be contacted, or a negative input to indicate to the service at the server that authorities should not be contacted; and send, in response to the affirmative input, a request message to the server to contact the authorities to report the vehicle as missing, wherein the request message indicates at least one of a vehicle identification number (VIN), a license plate number of the vehicle, and the second GPS information for the vehicle.

16. A system according to claim 10, wherein, after communicating the notification message, an application executing at the processor of the master CED is further configured to:

generate and present a query to an owner of the vehicle at a human machine interface requesting an authorization input from the owner, wherein the authorization input comprises either an affirmative input to indicate to a service at a server that an authorized person has accessed the vehicle, or a negative input to indicate to the service at the server that an unauthorized person has accessed the vehicle; and in response to the negative input: generate and present a query to the owner of the vehicle at the human machine interface requesting an input from the owner, wherein the input comprises either: a second affirmative input to indicate to the service at the server that authorities should be contacted, or a second negative input to indicate to the service at the server that authorities should not be contacted; and in response to the second affirmative input, send a request message to the server to contact the authorities to report the vehicle as missing, wherein the request message indicates at least one of a vehicle identification number (VIN), a license plate number of the vehicle, and the second GPS information for the vehicle.

17. A vehicle, comprising:
an onboard computer system comprising a wireless communication interface, wherein the onboard computer system is configured to:
  determine, in response to a trigger event indicating that the vehicle has been accessed, whether an authorized consumer electronics device (CED), that is associated with an authorized person, has connected to the wireless communication interface, and
  communicate, when the onboard computer system determines that the authorized CED has not connected to the wireless communication interface, a notification message to a master CED associated with an owner of the vehicle, wherein the notification message indicates that the vehicle has been accessed and that the authorized CED has not connected to the wireless communication interface to provide notice that the vehicle has been accessed by an unauthorized person.

18. A vehicle according to claim 17, when the authorized CED is not connected to the wireless communication interface, wherein the onboard computer system is further configured to:
  communicate, to a server, a warning message that indicates that the vehicle has been accessed and that the authorized CED has not connected to the wireless communication interface.

19. A vehicle according to claim 18, when the authorized CED is not connected to the wireless communication interface, wherein the onboard computer system is further configured to:
  communicate, to an application at the master CED via the server, an activation message that indicates that GPS tracking of the vehicle has been activated; and
  periodically send, to the server, first GPS information comprising first GPS coordinates of the vehicle.

20. A vehicle according to claim 17, wherein the onboard computer system determines whether the authorized CED has connected to the wireless communication interface by determining whether there is a wireless connection between the wireless communication interface and the authorized CED.

21. A consumer electronics device (CED) associated with an owner of a vehicle, the CED comprising:
  a human machine interface;
  a memory comprising a non-transitory processor-readable storage medium configured to store an application comprising at least one module comprising processor executable instructions; and
  a processor configured to execute the application in response to receiving an indication that the vehicle has been accessed and that an authorized CED has not connected to a wireless communication interface of the vehicle, wherein the application comprises:
    a first module that when executed by the processor is configured to:
      compute, each time first GPS coordinates of the vehicle are received from a server, a separation distance between vehicle and the CED based on a difference between the first GPS coordinates and second GPS coordinates of the CED;
      determine whether the separation distance between the vehicle and the CED is less than a threshold;
      send, when the separation distance is determined greater than or equal to the threshold, a notification message to the human machine interface to indicate that vehicle has been accessed and that the authorized CED has not connected to the wireless communication interface, and a warning message to the server indicating that the vehicle has been accessed and that the authorized CED has not connected to the wireless communication interface.

22. A CED according to claim 21, wherein the application further comprises:
  a second module that when executed by the processor is configured to:
    generate and present a query at the human machine interface requesting an authorization input from the owner comprising either: an affirmative input to indicate that an authorized person has accessed the vehicle, or a negative input to indicate that an unauthorized person has accessed the vehicle; and
    in response to the negative input: generate and present a query at the human machine interface requesting an input from the owner comprising either: a second affirmative input to indicate that authorities should be contacted, or a second negative input to indicate that authorities should not be contacted; and
    in response to the second affirmative input, send a request message to the server to contact the authorities to report the vehicle as missing, wherein the request message indicates at least one of a vehicle identification number (VIN), a license plate number of the vehicle, and the second GPS information for the vehicle.

* * * * *